Nov. 5, 1935.  G. A. LYON  2,019,715
MULTISECTION TIRE COVER
Filed Jan. 2, 1932   2 Sheets-Sheet 1
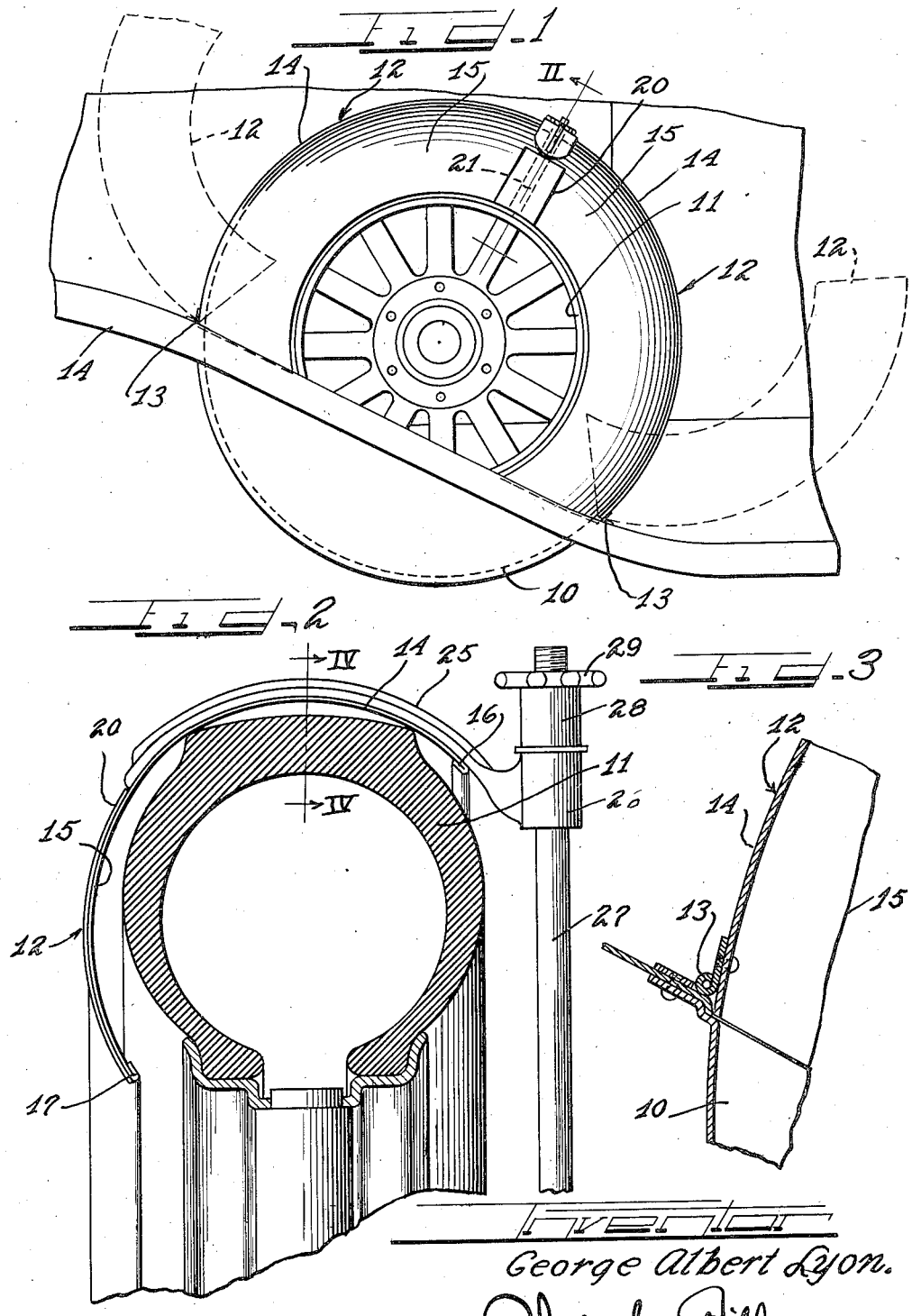
George Albert Lyon.

Nov. 5, 1935.  G. A. LYON  2,019,715
MULTISECTION TIRE COVER
Filed Jan. 2, 1932  2 Sheets-Sheet 2
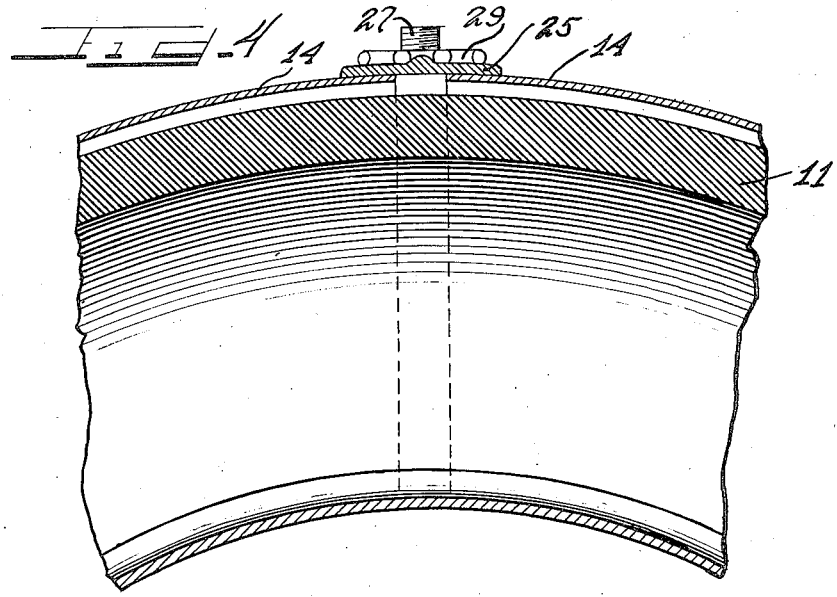
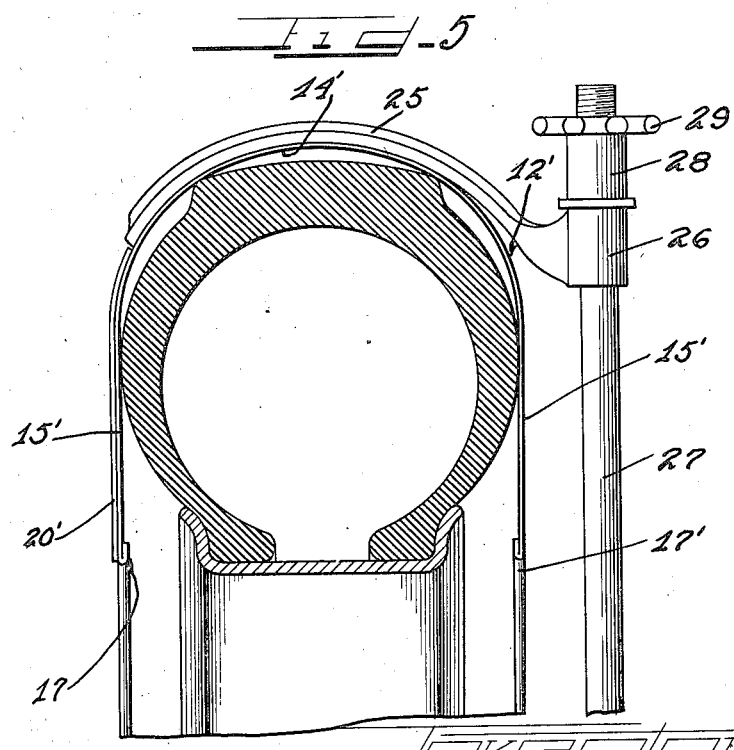
Inventor
George Albert Lyon.
by Charles Mills Attys.

Patented Nov. 5, 1935

2,019,715

UNITED STATES PATENT OFFICE 2,019,715

MULTISECTION TIRE COVER

George Albert Lyon, Allenhurst, N. J., assignor to Lyon Incorporated, Asbury Park, N. J., a corporation of Delaware Application January 2, 1932, Serial No. 584,555

1 Claim. (Cl. 150—54)

This invention relates to a multi-section spare tire cover in which a plurality of hingedly supported parts are adapted to be brought into cooperation to cover the exposed tread and outer side wall portions of a spare tire disposed in a conventional fender well of an automobile.

It is an object of this invention to provide an improved spare tire cover especially adapted for use in connection with a spare tire disposed in a fender well of an automobile and which is so arranged that the tire may be removed or put in the well without necessitating removal of the cover parts from the fender on which they are supported.

Another object of the invention is to provide a simplified construction for holding a plurality of hingedly supported cover sections in cooperation on a spare tire disposed in the fender well of an automobile.

In accordance with the general features of this invention there is provided a cover for a spare tire disposed in an automobile fender well which cover includes a pair of cooperable arcuate sections hingedly connected to the fender at opposite sides of the well and having their free ends formed for cooperation together so as to afford a cover for the exposed tread and outer side wall portions of the spare tire disposed in the fender well.

Another feature of the invention relates to the provision of mechanism for interconnecting the free ends of the arcuate cover sections of the tire cover so as to hold them in cooperation with the spare tire disposed in the fender well.

Other objects and features of this invention will more fully appear from the following detailed description taken in connection with the accompanying drawings which illustrate several embodiments thereof, and in which Figure 1 is a side view of a spare tire cover embodying the features of my invention and showing it applied to a spare tire disposed in the fender well of an automobile, the dotted line position of the cover sections illustrating the position in which they are when the cover is off the tire;

Figure 2 is an enlarged cross-sectional view taken on substantially the line II—II of Figure 1 looking in the direction indicated by the arrows;

Figure 3 is an enlarged detail sectional view taken through the hinged end of one of the arcuate sections of the cover;

Figure 4 is a fragmentary sectional view taken on the line IV—IV of Figure 2 looking in the direction indicated by the arrows; and Figure 5 is a view similar to Figure 2 illustrating a slight modification of the invention in which each section of the cover is provided with two side flanges so as to extend over and alongside both sides of the spare tire.

On the drawings:

The reference character 10 designates generally a fender well of an automobile in which a spare tire and wheel 11 is adapted to be disposed in the usual way. Associated with this wheel and spare tire 11 is a cover embodying the features of this invention comprising two arcuate shaped sections 12 and 12, each of which is hingedly connected at 13 to the fender 14.

Since these arcuate sections 12—12 are substantially identical in construction, the description of one will necessarily suffice for both. Each section 12 embodies convex rim and side portions 14 and 15 for disposition over the exposed tread and outer side wall portions of the spare tire 11. These two portions 14 and 15 are integral and have turned edges 16 and 17. Furthermore it will be noted that the rim portion 14 formed for disposition over the tread of the tire has its turned edge 16 extending inwardly from the outermost periphery of the tire so as to be disposed alongside of the rear edge of the tread of the tire 11 (Figure 2). This feature is advantageous in that the turned edge 16 is enabled to aid in preventing lateral displacement of the cover section relative to the tire disposed thereunder.

The free ends of the two arcuate sections 12—12 are adapted to be moved from the dotted line position shown in Figure 1 to the full line position, in which position the ends are disposed in close proximity to each other so that a plate 20 secured to one of these ends will overlap and cover the space 21 separating the free ends of the sections 12—12 (Figure 1). This plate 20 may be secured to either one of the sections 12—12 by any suitable means such, for example, as screws, bolts, etc.

Attention is also directed to the fact that the two sections 12—12 together extend around substantially more than one-half the periphery of the tire or, in other words, are disposed about more than 180° of the circumference of the tire so as to cover all of the exposed tread and outer side wall portions of the tire above the fender well and fender.

The two sections are held in cooperation on the tire by means of a curved clamping arm 25 shaped to be disposed over the tops of the sections at the free ends of the sections. This enables the curved arm 25 to cover the space separating the free ends of the rim part 14 of the cover at the top of the cover. The arm 25 has a hub portion 26 slidably disposed on a vertical rod 27 suitably carried by the chassis of the automobile at the rear side of the spare wheel and tire disposed in the fender well 10. This arm and hub 26 is adapted to be forced downwardly on the rod 27 by means of a nut 28 threadedly disposed on the upper end of the rod 27 and provided with a hand wheel 29 by which the nut may be turned to move the clamping arm downwardly into tight cooperation with the two arcuate sections 12—12. Thus it will be evident that when the clamping arm 25 is in the position shown in Figures 1 and 2 it will serve to overlap the space separating the rim portions of the two sections 12—12, and will also serve to hold the two cover sections in proper tire protecting position on the spare tire disposed in the fender well.

In Figure 5 I have illustrated a slight modification of the invention in which similar numerals designate parts common to this form of the invention and the form illustrated in Figure 2. It will be noted that the principal difference between this form of the invention and the form illustrated in Figure 2 is that each arcuate section 12' is provided with two side wall portions 15'—15' so that these sections may extend down alongside both sides of the spare tire disposed in the fender well. The side wall portions 15' are interconnected by a curved rim portion 14' similar to the rim portion 14 with the exception that it does not have a free edge such as the edge 16 of the preferred form. The innermost edges of the two side wall portions 15'—15' terminate at turned edges 17'—17'. Then, too, it will be noted that the side wall portions 15' of each of the sections 12' are formed straight rather than convex as is the case with the preferred form of the invention.

In this modified form of the invention, the two sections 12' are held in cooperation by the clamping arm 25 in the same way as the sections 12—12 are held in cooperation. Furthermore, the plate 20' may be secured to one of the sections 12' to overlap the space separating the free ends of the cover at the outer side wall thereof in the same way as plate 20 overlaps the space separating the ends of the two sections 12—12 of the preferred form.

Now I desire it understood that although I have illustrated and described in detail the preferred embodiments of this invention, the invention is not to be thus limited but only insofar as defined by the scope and spirit of the appended claim:

I claim as my invention:

In a tire cover construction for application to a spare tire disposed in the fenderwell of an automobile, a pair of cooperable hingedly supported arcuate sections movable toward each other and to a position over the tire with their free ends spaced apart, and clamping means movable independently of said sections and disposed to engage the free ends of said sections for holding the sections in proper position on the tire, said means comprising a clamping element for bridging the space between the free ends of the sections and for overlapping both of said free ends, a support for said element and means for adjustably connecting said clamping element to said support so that said clamping element may be pressed downwardly and held in tight adjusted engagement with the spaced ends of said sections to press the sections into tight cooperation with the spare tire and thus to accommodate slight variations in the size and contour of the tire.

GEORGE ALBERT LYON.